United States Patent [19]
Hayashi

[11] Patent Number: 5,289,270
[45] Date of Patent: Feb. 22, 1994

[54] IMAGE PROCESSING APPARATUS FOR PERFORMING DENSITY CONVERSION

[75] Inventor: Kimiyoshi Hayashi, Kawasaki, Japan

[73] Assignee: Canon Kabushiki Kaisha, Tokyo, Japan

[21] Appl. No.: 912,669

[22] Filed: Jul. 14, 1992

Related U.S. Application Data

[63] Continuation of Ser. No. 436,746, Nov. 15, 1989, abandoned, which is a continuation of Ser. No. 112,468, Oct. 26, 1987, Pat. No. 4,905,079.

[30] Foreign Application Priority Data

Oct. 28, 1986 [JP] Japan .................. 61-257548

[51] Int. Cl.$^5$ .............................................. H04N 1/46
[52] U.S. Cl. .................................. 358/512; 358/500; 358/527
[58] Field of Search ............... 358/403, 404, 407, 78, 358/75, 80, 443, 448, 444; H04N 1/46

[56] References Cited

U.S. PATENT DOCUMENTS

| | | | |
|---|---|---|---|
| 4,092,668 | 5/1978 | Knop | 358/78 |
| 4,495,523 | 1/1985 | Ozawa | 358/482 |
| 4,573,083 | 2/1986 | Shimizu | 358/407 |
| 4,618,883 | 10/1986 | Sakamoto | 358/80 |
| 4,760,458 | 7/1988 | Watanabe et al. | 358/75 |
| 4,905,079 | 2/1990 | Hayashi | 358/78 |
| 5,028,992 | 7/1991 | Arai | 358/78 |
| 5,038,298 | 8/1991 | Matsumoto et al. | 359/148 |

FOREIGN PATENT DOCUMENTS 0170275 10/1983 Japan .................. 358/403

*Primary Examiner*—Edward L. Coles, Sr.
*Assistant Examiner*—Jill Jackson
*Attorney, Agent, or Firm*—Fitzpatrick, Cella, Harper & Scinto

[57] ABSTRACT

According to this invention, an image processing apparatus separates a color original into a plurality of color signal components and sequentially reads the color signal components by read means so as to sequentially form images corresponding to the color signal components on a photosensitive body. In this apparatus, at least two color signal components of a color image to be synthesized with the color original are simultaneously read and are stored in an image memory by the read means, and upon image synthesis, the color signal components are read out from the image memory in synchronism with color signal components read by the read means.

40 Claims, 16 Drawing Sheets

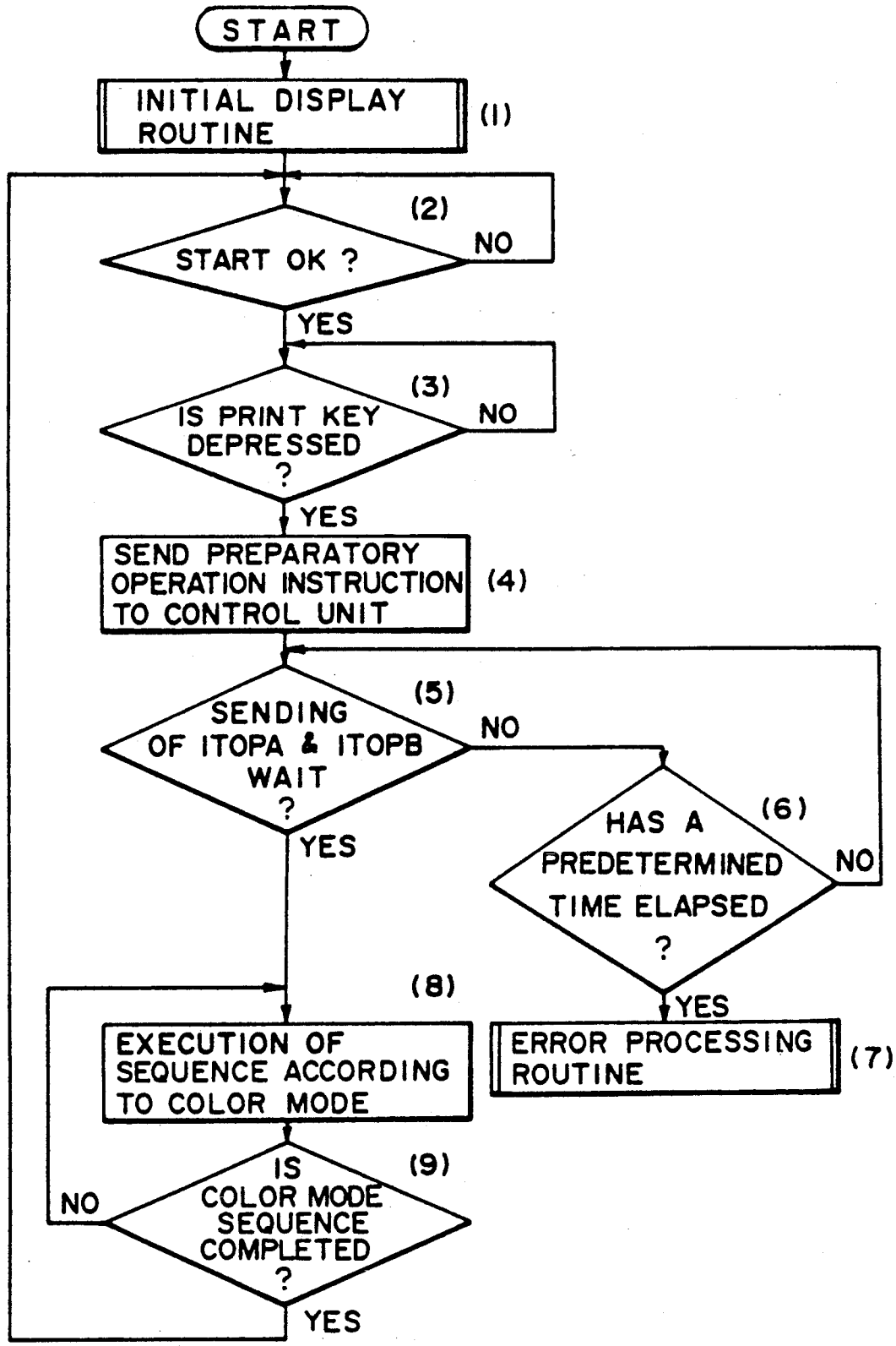
F I G. 6A

IMAGE PROCESSING APPARATUS FOR PERFORMING DENSITY CONVERSION

This application is a continuation of application Ser. No. 07/436,746 filed Nov. 15, 1989, now abandoned, which in turn is a continuation of application Ser. No. 07/112,468 filed Oct. 26, 1987, now U.S. Pat. No. 4,905,079.

BACKGROUND OF THE INVENTION:

1. Field of the Invention

The present invention relates to a color image processing apparatus.

2. Related Background Art

In an apparatus of this type, a read state of a color original and reproduced colors cannot be known until the resultant image is output, and color adjustment must be performed in a trial and error manner, resulting in cumbersome and time consuming color adjustment.

For this reason, in one conventional apparatus, a color original is photoelectrically converted to obtain color separation signals and a plurality of recording image signals, and the image signals are further converted to three-color image signals in order to display the image signal on a color CRT.

In such an apparatus, the volume of data obtained by photoelectrically converting a color original is often much larger than that which can be displayed on a color CRT, and a display method in such a case must be improved.

As an apparatus for processing a color image, an image processing apparatus for separating red and black components and respectively processing these components with different resolutions is filed in U.S. patent application No. 06/930,046, filed Nov. 12, 1986, now U.S. pat. No. 4,718,040, which is a continuation of applicaton No. 06/671,025, filed Nov. 14, 1984 now abandoned, which is a continuation of application No. 06/618,460, filed Jun. 8, 1984, now abandoned, which is a continuation of application No. 06/370,463, filed Apr. 21, 1982, now abandoned, by the same assignee as the present invention.

In this apparatus, a color image is processed simply using red and black components. Strictly speaking, this apparatus cannot cope with a plurality of color components, and there is much room for improvement.

SUMMARY OF THE INVENTION:

It is a first object of the present invention to provide a novel color image processing apparatus free from the conventional drawbacks.

It is a second object of the present invention to provide a color image processing apparatus which adopts a color image processing means which needs to process only a small data volume to process a color original having a large data volume while achieving the first object.

In order to achieve the above object, according to preferred embodiments of the present invention, there is provided an apparatus which has means for reading color data while separating the color data into a plurality of color components and converting the color components into electrical signals, and processes an image in accordance with color separation signals, wherein the number of pixels of the color reading means is set to be different from that of color display means, and at least one of the plurality of color separation signals is subjected to different processing from that for other color separation signals to be supplied to the color display means, whereby the plurality of color separation signals can be satisfactorily processed.

It is another object of the present invention to provide an image processing apparatus which can easily synthesize or edit a color original to record the synthesized or edited data in a recording means.

It is still another object of the present invention to provide an image processing apparatus which can synthesize a given color original with another or identical color original by the smallest number of read operations.

In order to achieve the above objects, according the preferred embodiments of the present invention, there is provided an image processing apparatus for separating a color original into a plurality of color signal components and sequentially reading the color signal components by read means so as to sequentially form images corresponding to the color signal components on a photosensitive body, wherein at least two color signal components of a color image to be synthesized with the color original are simultaneously read and are stored in an image memory by the read means, and upon image synthesis, the color signal components are read out from the image memory in synchronism with color signal components read by the read means.

The above and other objects and features of the present invention will become apparent from the following description of the preferred embodiments taken in conjunction with the accompanying drawings.

BRIEF DESCRIPTION OF THE DRAWINGS

FIGS. 6A to 6C are flow charts of control sequences of control units 19, 1403 and 1304 in FIG. 2, respectively;

Figure 1:
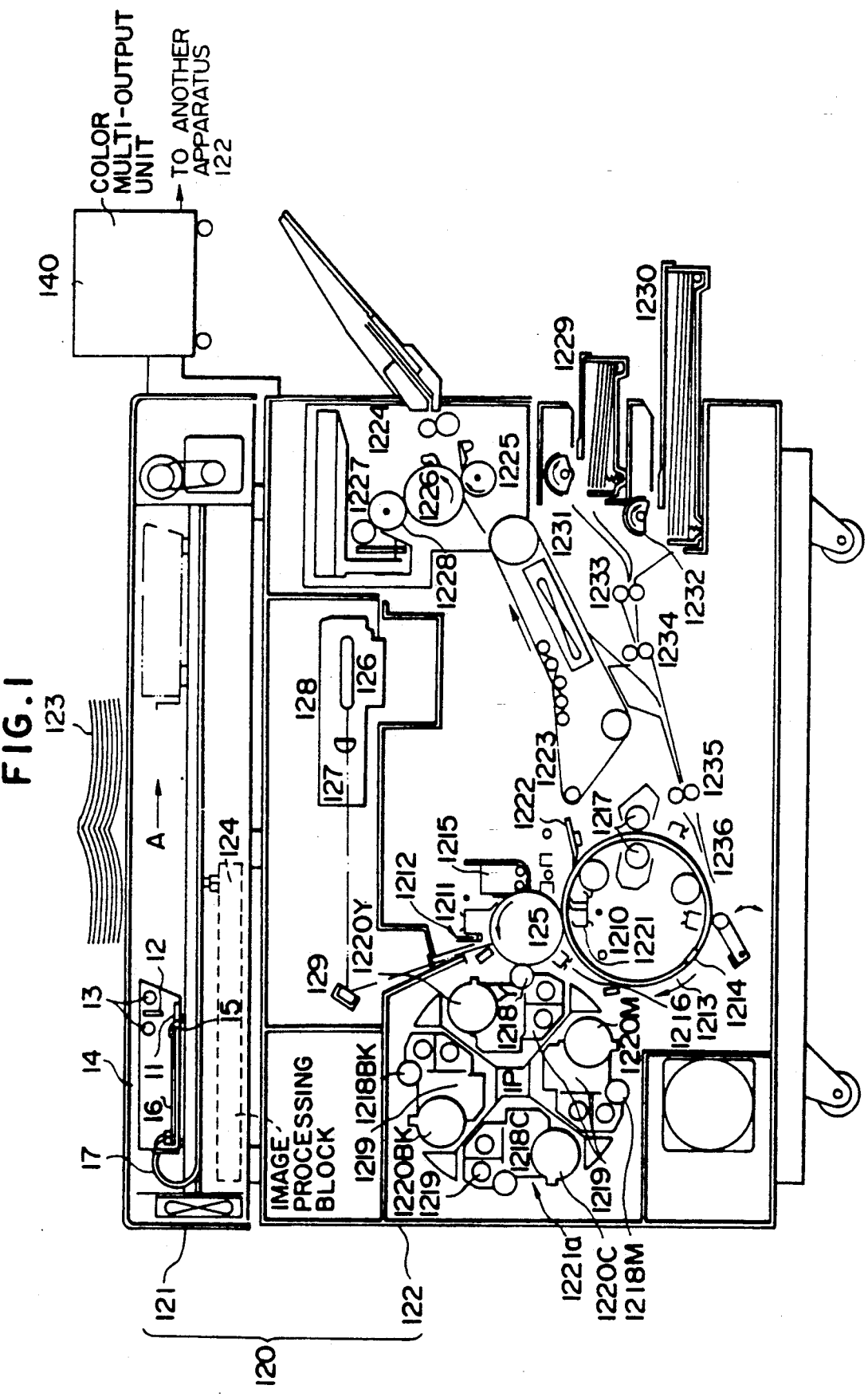
FIG. 1 is a longitudinal sectional view of an image forming apparatus.

An optical image focused on the CCD sensor 11 is converted to electrical signals corresponding to respective color components. The electrical signals are transmitted to a signal processing board 16 through a flexible power cable 15. The signal processing board 16 processes the electrical signals in order to send them through a longer flexible power cable 17. Predetermined processing is performed by an image processing block 124 which receives the electrical signals. Color separation image electrical signals formed by the image processing block 124 are transmitted to a printer 122.

In the sectional view of FIG. 1, the sequential printer 122 is an electrophotographic laser beam color printer, having a photosensitive drum 125. An image forming operation will be described with reference to FIGS. 2A, 2B. The color separation image signals read by the color reader 121 (FIG. 1) are developed into time-divisional signals in units of pixels through a tone control block 1300-a having a synchronization memory 1300-1-a (or 1300-1-b), a tone control circuit 1300-2-a (or 1300-2-b) and a synchronizing control unit 1300-3-a (or 1300-3-b), and data corresponding to an image density is finally modulated by a laser $1301_a$ (or $1301_b$) in FIG. 2B. A laser beam modulated in correspondence with an image is scanned at high speed by a polygonal mirror 126 which is rotated at high speed, and is then reflected by a mirror 129 to perform dot exposure on the surface of the photosensitive drum 125 in correspondence with an image. One horizontal scanning of a laser beam corresponds to that of an image, and has a width of 1/16 mm in this embodiment Meanwhile, since the photosensitive drum 125 is rotated at a constant speed in a direction indicated by an arrow, a planar image is exposed by the laser beam scanning in the main scan direction and by constant rotation of the photosensitive drum 125 in the sub-scan direction. Prior to exposure, the surface of the photosensitive drum 125 is uniformly charged by a charger 1211, and the charged photosensitive drum is exposed to form a latent image. A latent image of a predetermined color signal is visualized by a developer 1220 corresponding to the predetermined color. For example, first original exposure scanning in the color reader will be exemplified. In this case, a dot image of a yellow component of an original is exposed on the photosensitive drum 125 by the laser 1301 (not shown in FIG. 1), and is developed by a yellow developer 1218A. Then, the yellow toner image is transferred by a transfer charger 1221 onto a paper sheet (not shown in FIG. 1) wound around a transfer drum 1210 at a contacting point between the photosensitive drum 125 and the transfer drum 1210. The same process as described above is repeated for M (magenta), Cy (cyan), and BK (black) images, so that these images are sequentially formed on the paper sheet, thus forming a color image by four color toners. The paper sheet is peeled from the transfer drum 1210 by a peel pawl 1222 in FIG. 1, and is conveyed to an image fixing section 1224 along a conveyor belt 1223. Then, the toner images are melted and fixed by thermal compression rollers 1225 and 1226, thus obtaining a color print image. The apparatus shown in FIG. 1 also includes cassettes 1229 and 1230 for storing paper sheets, paper feed rollers 1231 and 1232, and timing rollers 1233 to 1235 for taking timings of paper feed and convey operations. The paper sheet fed and conveyed through these members is guided by a paper guide 1236, and is wound around the transfer drum 1210 while its leading end is gripped by grippers 1214. Thereafter, the paper sheet is subjected to the image formation process. The developer unit 1221a shown in FIG. 1 develops an electrostatic latent image formed on the surface of the photosensitive drum 125 by the above-mentioned laser exposure. Developing sleeves 218Y, 1218M, 1218C, and 1218BK are brought into contact with the photosensitive drum 125 to directly perform development. Toner hoppers 1220Y, 1220M, 220C, and 1220BK respectively hold corresponding supplementary toners. In addition, a screw 1219 is adopted to feed a developing agent. When an M (magenta) toner image is formed, the developer unit is rotated about IP in FIG. 1, and the developing sleeve 1218M of the magenta developer is arranged to be in contact with the photosensitive drum 125. Cy (cyan) and BK (black) images are also developed in the same manner as described above.

Figure 2A:
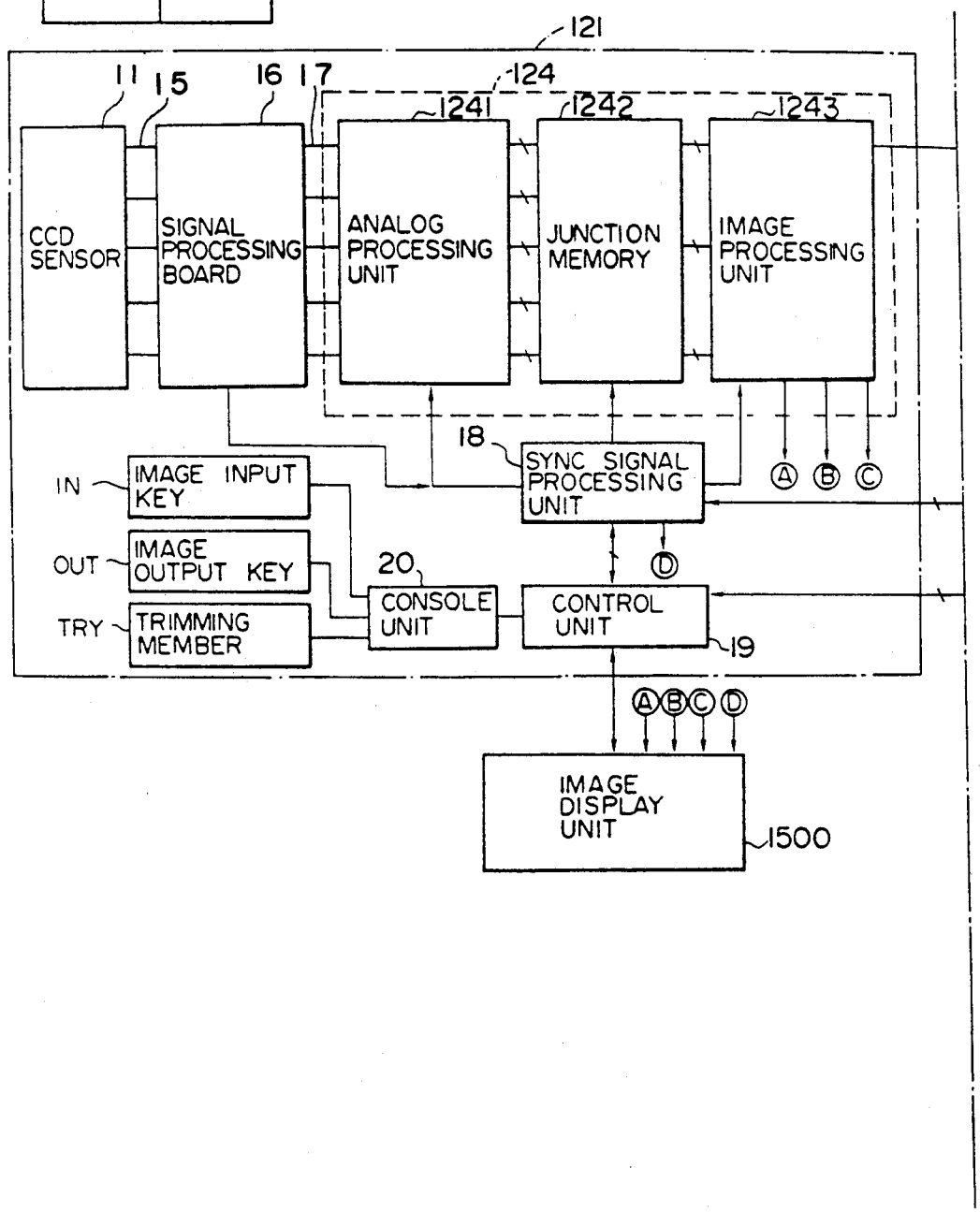
FIGS. 2A and 2B are a block diagram of the image forming apparatus.
Figure 2B:
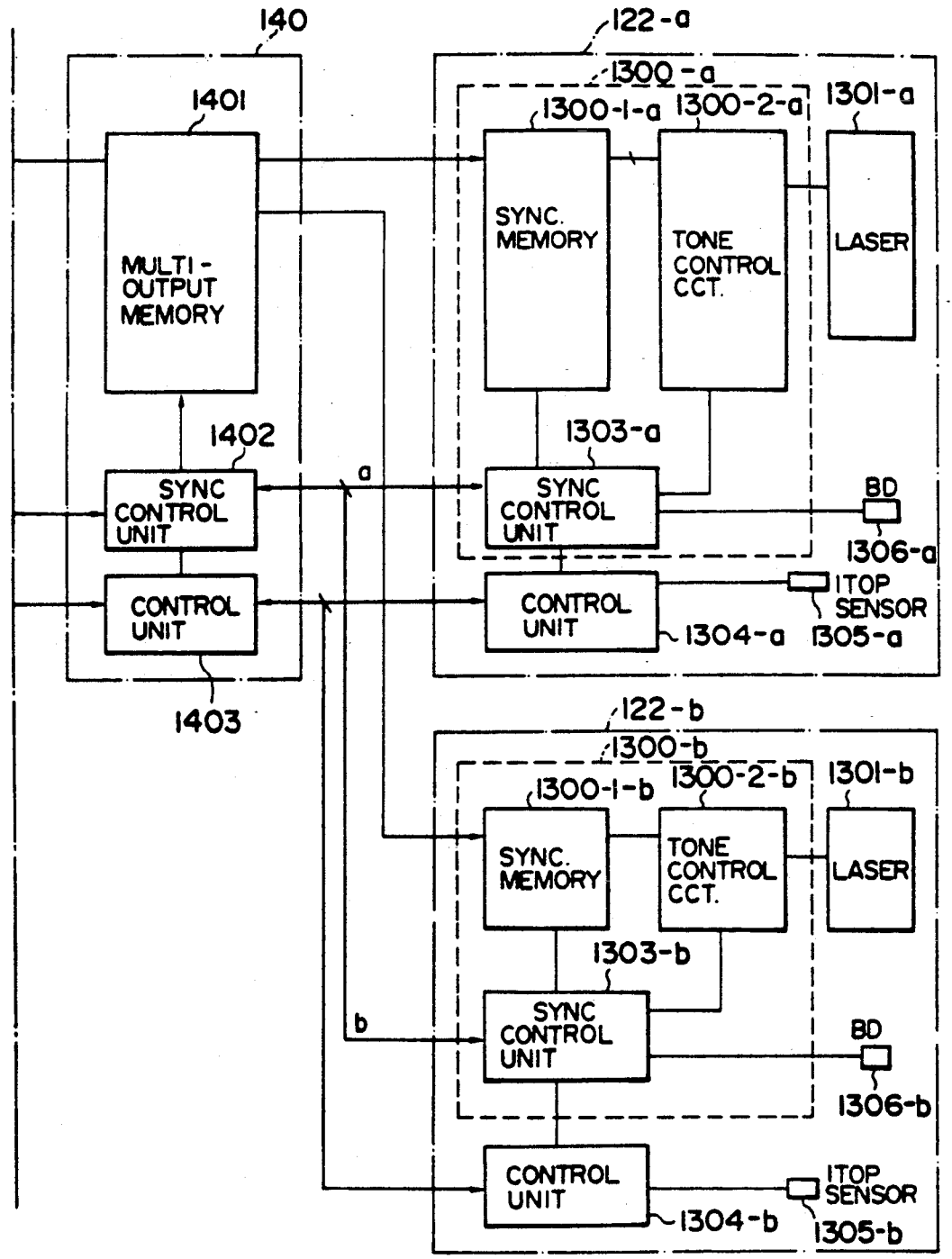

In the apparatus with the above arrangement, a case will be described in which or more printers 122 are connected to the reader 121. FIG. 2A and 2B shows electrical blocks. Electrical image signals output from the contact type CCD sensor 11 are output in synchronism with a sync signal processing circuit 18 for forming a reader horizontal sync signal (to be referred to as "RHSYNC" hereinafter) by a quartz oscillator independently of the printer in the same cycle as a horizontal sync signal cycle of the printer, and forming a drive frequency signal for the CCD sensor 11 and a developing reference signal for a junction memory and thereafter. The electrical image signals are subjected to waveform modulation processing so that high frequency components can be stably transmitted, and are then transferred to the image processing block 124. In the image processing block 124, the input signals are first transferred to an analog processing unit 1241. In the analog porcessing unit, since one chip of the CCD sensor sequentially outputs C, G, and Y signals in units of pixels, these signals are separated in units of C, G, and Y colors in correspondence with the respective color developers. Since the Y, M, and C color developers are provided, the read signals must be converted to R, G, and B signals. Since $C-G=B$ and $Y-G=R$ can be established, arithmetic operation processing is performed. The output voltages of these separated signals are linearly changed in accordance with a change in density. In order to perform a high speed operation, in this embodiment, the signals must be stabilized, and hence, 8-bit A/D conversion is performed. The above processing operations are performed by the analog processing unit. Since the digital color image signals in the horizontal sync period are divided into 5 channels, they are synthesized to be a single image by a junction memory 1242 by a known technique. The synthesized image signals are serially output from the junction memory 1242 to an IPU 1243 in units of colors. The IPU 1243 performs shading processing for correcting optical arrangement and masking processing for correcting colors. Furthermore, 8-bit image signals as desired color signals selected by a control unit 19 of the reader 121 are converted to signals consisting of 8 bits or less by image processing, and are output from the IPU 1243 to a color multi-output unit 140.

The color multi-output unit 140 receives image signals from the reader 121, and horizontal sync signals (to be referred to as PHSYNC-a and PHSYNC-b hereinafter) and vertical sync signals (to be referred to as ITOP-a and ITOP-b hereinafter) from printers 122-a and 122-b.

The vertical sync signals ITOP-a and ITOP-b respectively indicate image write-start points of the printers 122, and a signal output from an ITOP sensor 1305 is transmitted to the reader 121 through a control unit 1304. In a color copying machine and a machine in which a paper feed member is held to register the leading end of an image, the image write-start point of the image signal must coincide with the vertical sync signal for several times of scan operations.

The ITOP-a and ITOP-b from the printers 122-a and 122-b are preferably synchronous with the RHSYNC of the reader, but are often synchronous therewith.

A method for performing vertical synchronization for transmission from the color multi-output unit to the printers will be described in detail.

The operations of the control units, 19, 1403, 1304-*a*, 1304-*b* and 12*g* shown in FIGS. 2A and 2B will be described with reference to FIGS. 6A to 6C.

FIG. 6A is a flow chart for explaining the operation of the control unit 19 in the color reader 121 shown in FIGS. 2A and 2B. Steps in the flow chart are represented by (1) to (9). Referring to FIG. 6A, an initial display routine is executed in step (1). The control unit 19 waits in step (2) until the color reader 121, the multi-output unit 140, and the color printers 122-*a* and 122-*b* are ready. If initialization is completed, the control unit 19 waits in step (3) until an image output key OUT in the operation unit 20 is depressed. When the key OUT is depressed, the control unit 19 sends a preparatory operation command to the control unit 1403 in the multi-output unit 140 and the control units 1304-*a* and 1304-*b* in the color printers 122-*a* and 122-*b* in step (4). The control unit 1304-*a* and 1304-*b* send a drive start signal to a drive system for the transfer drum, so that the transfer drum is rotated in the forward direction. Thereafter, the control unit 5 waits in step (5) until the ITOPB sensors 1305-*a* and 1305-*b* generate the image write enable signals ITOPA and ITOPB. If NO in step (5), the control unit 19 determines in step (6) whether the image write enable signals ITOPA and ITOPB are generated within a predetermined period of time. If NO in step (6), the flow returns to step (5). If the image write enable signals ITOPA and ITOPB are not generated, an error processing routine is executed in step (7).

However, if the control unit 19 determines in step (5) that the image write enable signals ITOPA and ITOPB are generated, a sequence according to the color mode of the multi-output unit 140 is executed in step (8). The control unit 19 determines in step (9) whether the sequence according to the color mode is completed. If NO in step (9), the flow returns to step (8). However, if YES in step (9), the flow returns to step (2).

Figure 6B:
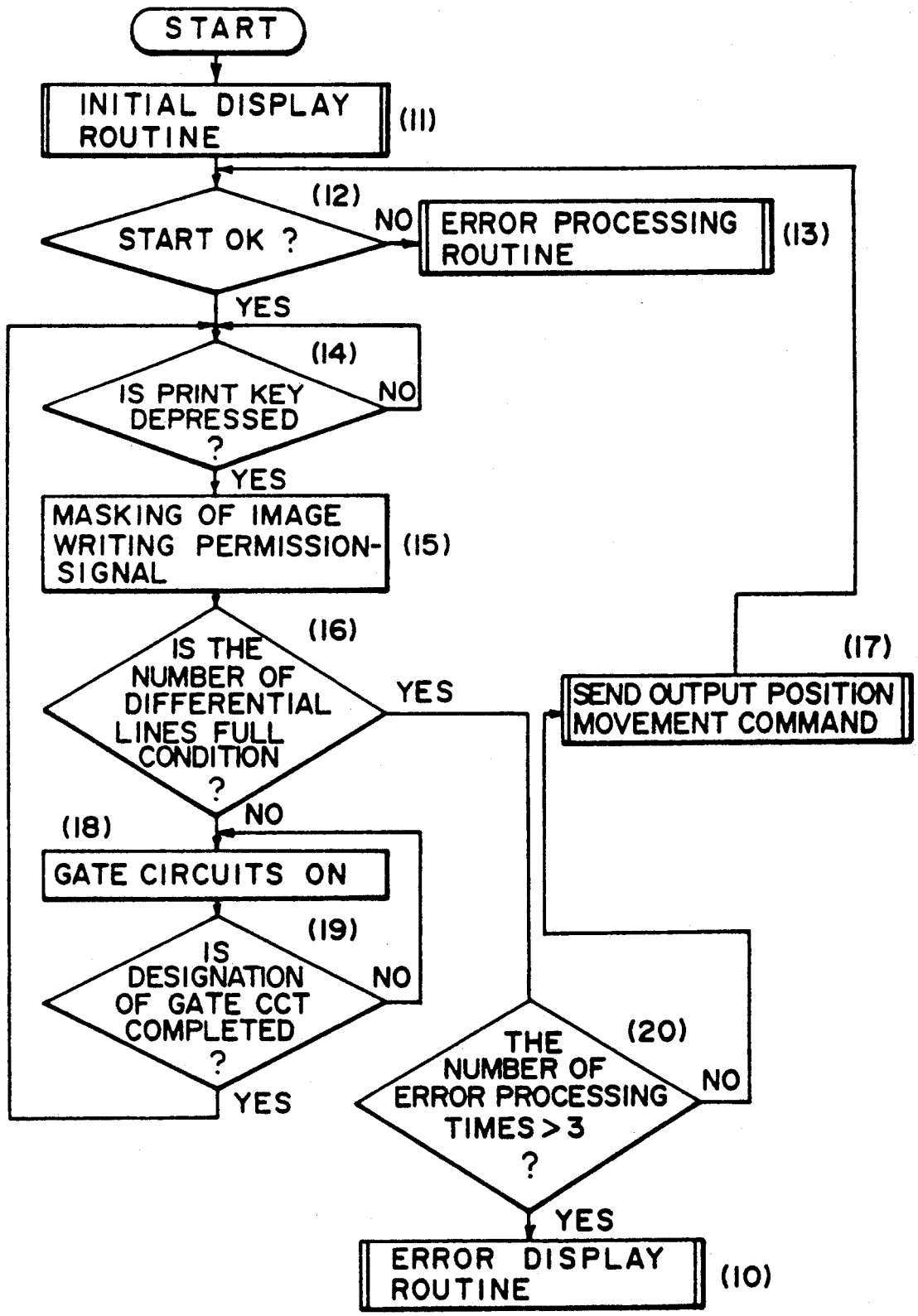

FIG. 6B is a flow chart for explaining the operation of the control unit 1403 in the multi-output unit 140 shown in FIG. 2. Steps are represented by (11) to (19).

Referring to FIG. 6B, the control unit 1403 executes and initial display routine in step (11) and determines in step (12) whether initialization of the color reader 121, the multi-output unit 140, and the color printers 122-*a* and 122-*b* is properly completed. If NO in step (12), an error processing routine in step (13) is executed. However, if YES in step (12), the control unit 20 waits for depression of the image output key OUT key in the operation unit 20. The AND gates 1446 and 1447 (shown in FIG. 4) are operated to mask the first image write enable signals ITOPA and ITOPB so as to prevent these signals from being sent to the color reader 121 in step (15). Subsequently, the control unit 1405 determines in step (16) whether a calculated line number difference corresponds to the number of line buffer memories in the multi-output memory 140, i.e., whether the difference exceeds the LBMN number or whether the memory is full. If YES in step (16), whether the number of times of error occurrence exceeds 3 is checked instep (20). If NO in step (20), the control unit 1403 outputs to the control unit 1304-*a* and 1304-*b* in the color printers 122-*a* and 122-*b* an error processing command for shifting the output timings of the image write enable signals ITOPA and ITOPB output from the color printers 122-*a* and 122-*b* in step (17). The flow returns to step (12). If the number of times of error occurrence exceeds 3, this is displayed on the operation unit 20, thereby signalling to the operator that the apparatus is inoperative. However, if the difference described above does not exceed the number of line buffer memories, the second image write enable signal, i.e., the signal ITOPA is output to the color reader 121. The gate circuits 1444 and 1445 are turned on in step (18) to output the image signal VIDEO corresponding to the color mode to the color printer 122-*a* or 122-*b*. The control unit 1403 then determines in step (19) whether designation of the gates 1444 and 1445 is completed. If NO in step (19), the flow returns to step (18). However, if YES in step (18), the flow returns to step (14).

Figure 6C:
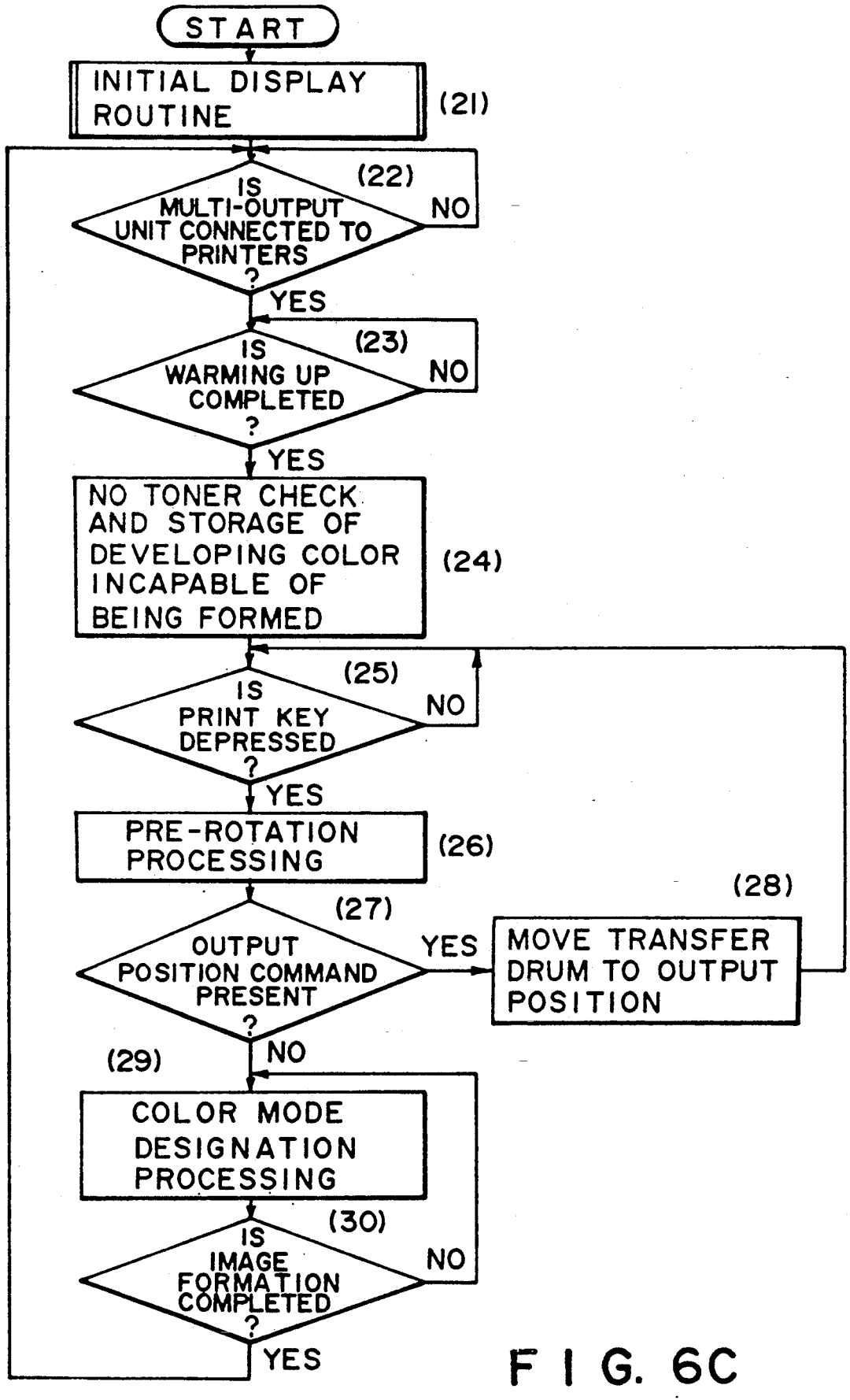

FIG. 6C is a flow chart for explaining the operation of the control units 1304-*a* and 1304-*b* in the color printers 122-*a* and 122-*b* shown in FIG. 2B. Steps are represented by (21) to (30).

The control units 1304-*a* and 1304-*b* execute an initial display routine in step (21) and wait for electric connections of the multi-output unit 140 to the color printers 122-*a* and 122-*b* in step (22). If the connections are completed, the control units 1304-*a* and 1304-*b* wait for warming-up in step (23). If YES in step (23), the control units 1304-*a* and 1304-*b* check the absence of toners. The color toners which are not available in the color printers 122-*a* and 122-*b* are signalled and stored in internal memories (RAMs) in the control units 1304-*a* and 1304-*b* in step (24). The control units 1304-*a* and 1304-*b* wait until operator depressed the image output key OUT in step (25). If the print key is depressed, pre-rotation processing is executed in step (26). Thereafter, as described above, the image write enable signals ITOPA and ITOPB are sent to the control unit 1403 in the multi-output unit 140. The control units 1304-*a* and 1304-*b* determine in step (27) whether the error processing command for shifting the output timings of the image write enable signals ITOPA and ITOPB is output. As described above, this command is generated from the multi-output unit 140 when a difference between the numbers of lines represented by the image write enable signals ITOPA and ITOPB exceeds the maximum number of lines in the line buffers in the multi-output memory 1401. If the command is determined to be output, the transfer drum is moved to a position where the leading end of the transfer position of the transfer drum 1210 is detected by the ITOP sensor 1305-1, 13-5-*b* in step (28). The flow then returns to step (25). If the command is determined not to be output, color mode designation processing is performed in step (29). The control unit 11*g* and 12*g* determine in step (30) whether image formation according to color mode designation processing is completed. If NO in step (30), the flow returns to step (29). However, if YES in step (30), the flow returns to step (22).

The operations of flows of FIGS. 6A to 6C will be described hereinbelow. After a power supply is turned on, respective I/0 terminals are checked by an initial routine (1, 11, and 21) to discriminate if the reader 121, the printers 122, and the multi-output unit 140 are connected (2, 12, and 22). In this case, in the printers 122-*a* and 122-*b*, it is checked if a warming-up operation is completed, and emptiness of toners is checked, so as to discriminate if a print operation can be executed. The discrimination result is transmitted to the reader 121 through the multi-output unit 140. In this case, when toners of all the colors are absent, the print operation cannot be performed. When the print operation is possible, the reader 121 receives a print key input from a console unit 20 and outputs a start command from the reader control unit 19 to the printers 122-*a* and 122-*b* through the multi-output unit 140 (4, 14, and 23). Then, pre-rotation processing is performed by both the printers 122-a and 122-b, and ITOP-a and ITOP-b reference signals are output (26). At this time, the multi-output unit 140 counts, in advance, a difference between early and late ITOPs from the printers 122-a and 122-b from the reader start command using the RHSYNC.

A control unit 1403 in the multi-output unit 140 discriminates the count value and a printer outputting a preceding ITOP, and outputs the preceding ITOP to the reader 121 as a regular ITOP.

In this manner, a read start signal is output to the reader 121 in synchronism with the output ITOP. When the read start signal RSTART is supplied to the control unit 19 of the reader 121, the reader 121 turns on an exposure lamp 13 to scan an object to be scanned. Video signals are transmitted to the multi-output unit 140 through respective units, e.g., the CCD sensor 11. The above description is not so associated with the present invention, and a detailed description will be omitted. The multi-output unit 140 outputs the video signals from the reader 121 to the printer having the preceding ITOP, without modification, and also outputs it to the printer having the delayed ITOP while recording delayed VIDEO data by a programmable counter of a delayed circuit block in a sync control unit 1402 which predetermines a delayed line.

Figure 3:
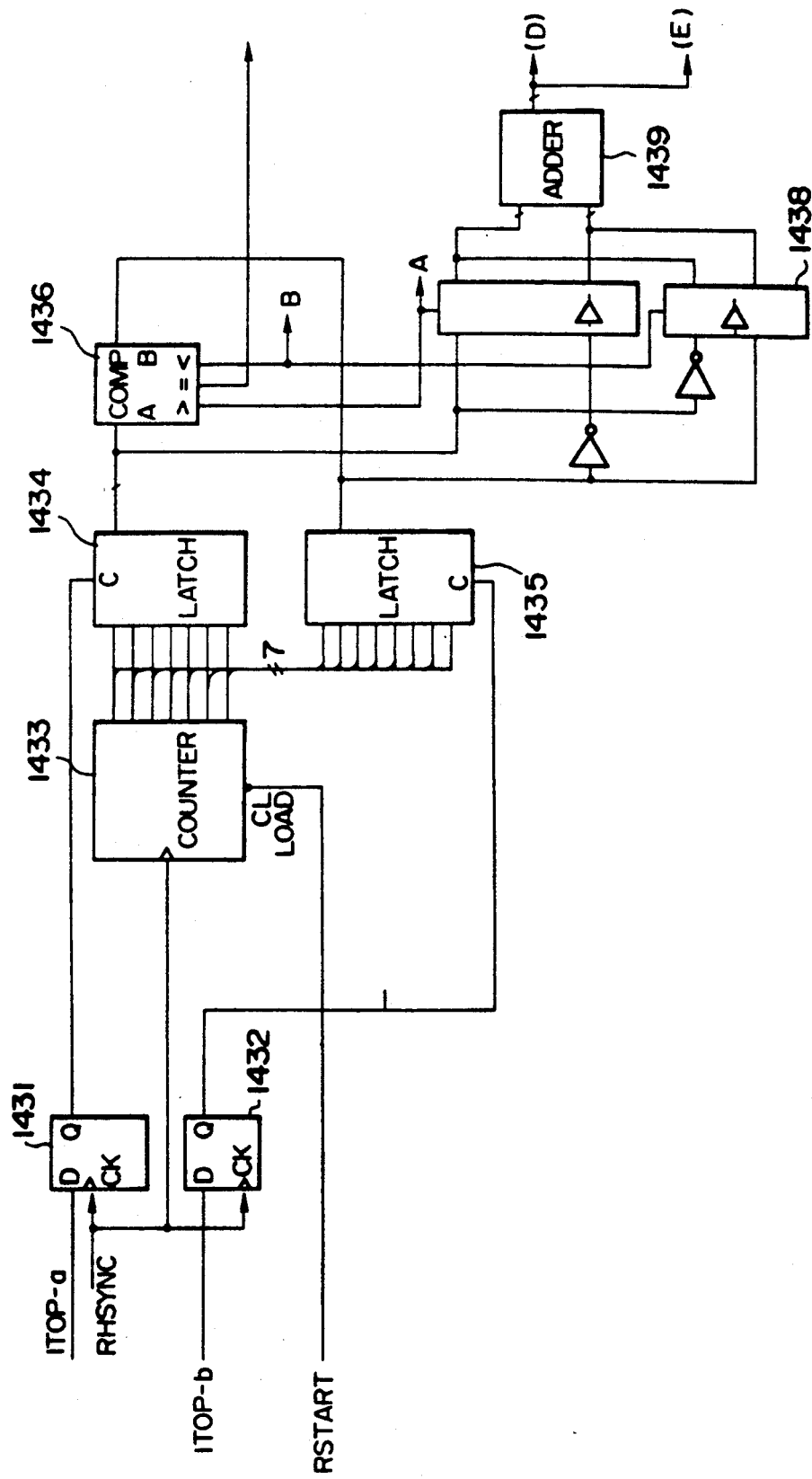
FIGS. 3 and 4 are block diagrams of a multi-output unit.

A discrimination means of a preceding ITOP from the two printers will be described with reference to FIG. 3. One printer outputs an ITOP-a and the other printer outputs an ITOP-b. The control unit 1403 in the multi-output unit 140 includes latch means 1431 and 1432 for latching the ITOP-a and ITOP-b of the printers using the RHSYNC when it receives the RHSYNC from the reader for the ITOPs from both the printers. The unit 1403 also includes a counter 1433 for counting a predetermined value with reference to the RHSYNC, latches 1434 and 1435 for latching count values in response to the first ITOP-a and ITOP-b when a start signal RSTART is output from the reader to the printers, and a comparator 1436 for determining a smaller latched value. The comparator 1436 distinguishes large (A), small (B), and equal (C) cases.

Figure 4:
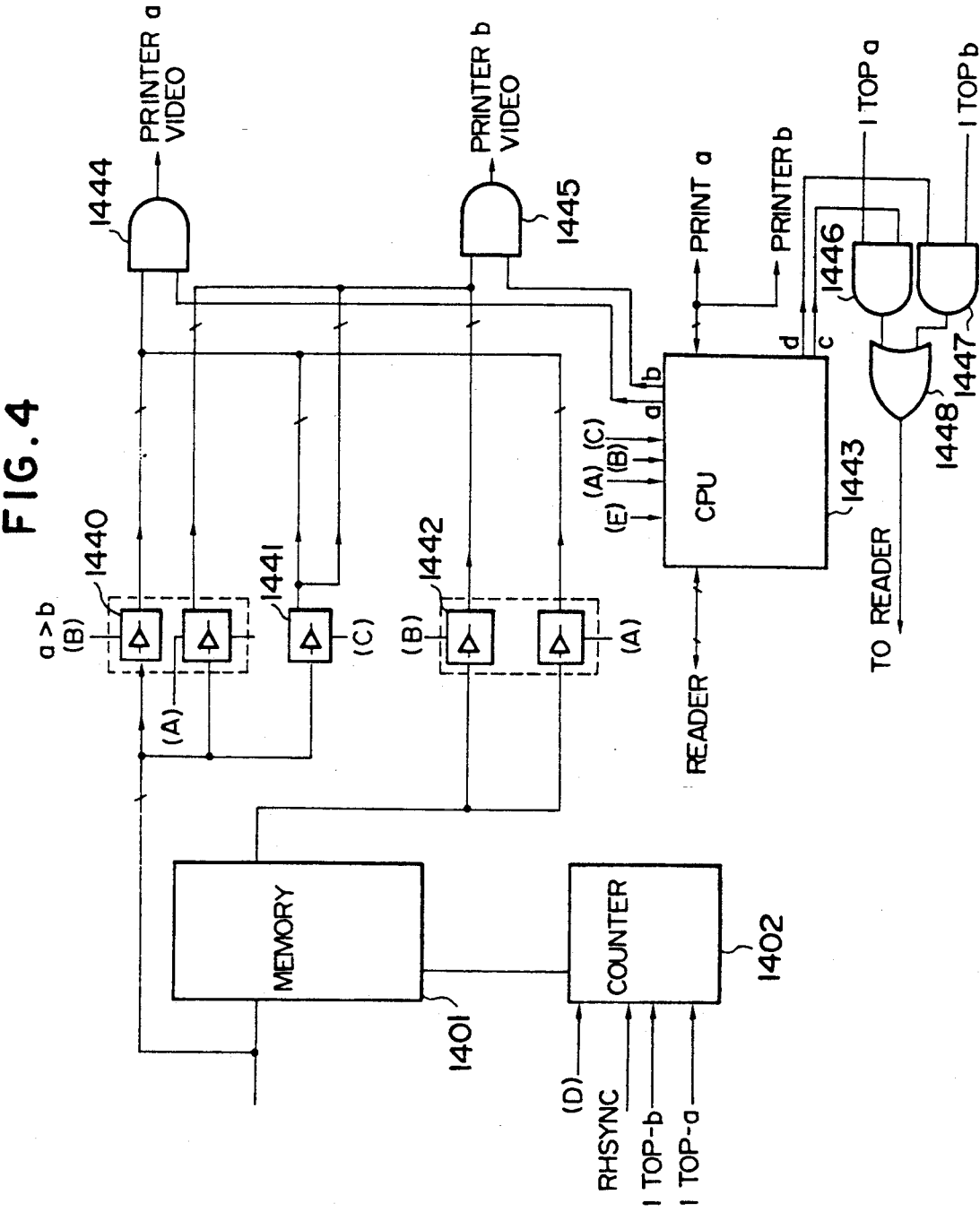

A counter circuit unit having a vertical counter and a main scan counter for controlling a buffer for a difference between the ITOP-a and ITOP-b, of n ring buffer memories will be described with reference to FIG. 4.

If the ITOP-b arrives earlier than the ITOP-a, an A signal line is selected, and a video signal is directly output to the printer 122-b. As for the printer 122-a, the video signal is delayed by selecting a memory by delaying by lines corresponding to a predetermined delay time using a circuit which outputs difference data so as to perform synchronization, and the video signal is output to printer 122-a.

If the ITOP-a arrives earlier than the ITOP-b, a B signal line is selected, the video signal is output directly to the printer 122-a, while it is delayed by a predetermined number of delay lines, and then output to the printer 122-b.

If the ITOP-a and ITOP-b are synchronous with each other, a C signal line is selected, and the video signal is directly transferred to the printers 122-a and 122-b.

Figure 5:
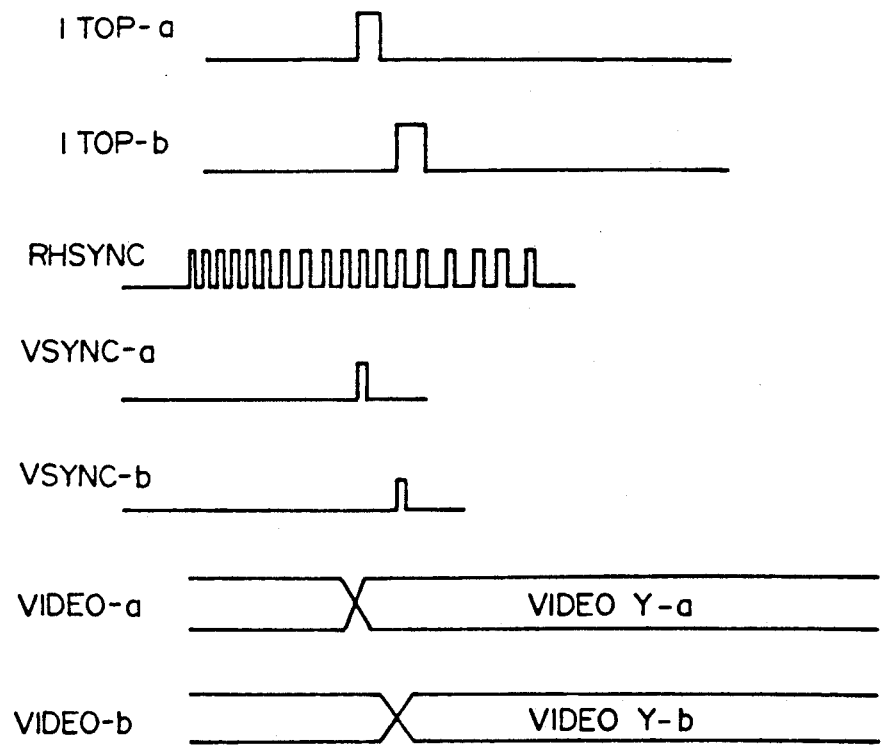
FIG. 5 is a timing chart.

FIG. 5 is a timing chart when the above-mentioned A signal line is selected. The video signal is delayed by a delay time corresponding to a count value of the difference between the ITOP-a and ITOP-b counted with reference to the RHSYNC using the n ring memories, and delayed signals VIDEO-a and VIDEO-b are output.

The printer 122-a receiving the image signals from the reader 121 performs speed conversion of image data by a known memory unit (in this case, a sync memory 1501-a) with reference to the RHSYNC and a reader clock CLK from the reader and the PHSYNC and a printer clock CLK inside the printer. The sync memory unit is controlled by a P sync control unit 1303-a with respect to the respective clocks.

The data speed-converted by the clock of the printer is optically output to the color printer by a tone control circuit for outputting tone controlled data to the laser 1301-a by a known technique for representing tone, thus forming a color image. The printer 122-b is also controlled in the same manner as in step 609. Since the image signals are output from the multi-output unit to the two printers in response to their ITOPs and the leading ends of the images are not misregistered, color copies without misregistration can be realized by a plurality of printers.

After the control unit 19 of the reader 121 sends the signal RSTART to the multi-output unit 140 and the printers 122-a and 122-b, it does not respond to the first ITOPs, and outputs color signals based on a predetermined color mode designated by the console unit in response to the second ITOPs. The printer masks using gate circuits 1446 to 1448 so as to output the ITOPs after the initial routine such as pre-rotation processing, and command the gate circuits so as to output ITOPs for a number of times corresponding to a designated color mode +1 (step 504).

The control unit 1403 of the multi-output unit includes a CPU 1443. The CPU 1443 decodes commands from the printers and reader, and performs communications therebetween. When a mode for sending Y, M, and Cy data to the printer a and Bk data to printer 122-b of the predetermined color signals from the reader is received, the Y, M, Cy data can be sent to the printer 122-a and the Bk data can be supplied to the printer 122-b using gates 1444 and 1445 (step 502).

When three or more printers are used, the number of n ring buffers must be increased. If the number of printers is given by Q, (Q-1) n ring buffers can be arranged.

Figure 7A:
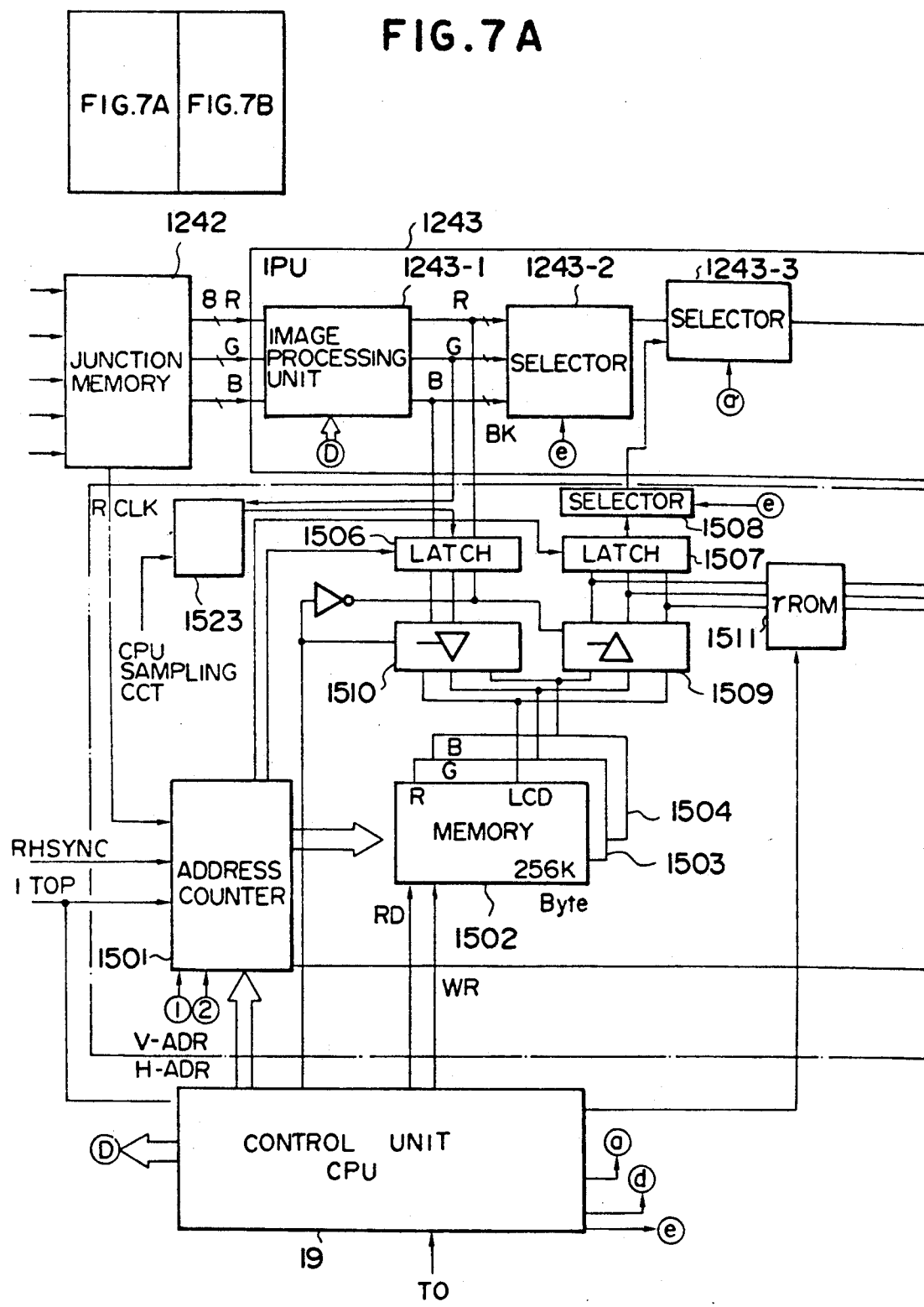
FIGS. 7A and 7B are a block diagram of a memory and a display mechanism.
Figure 7B:
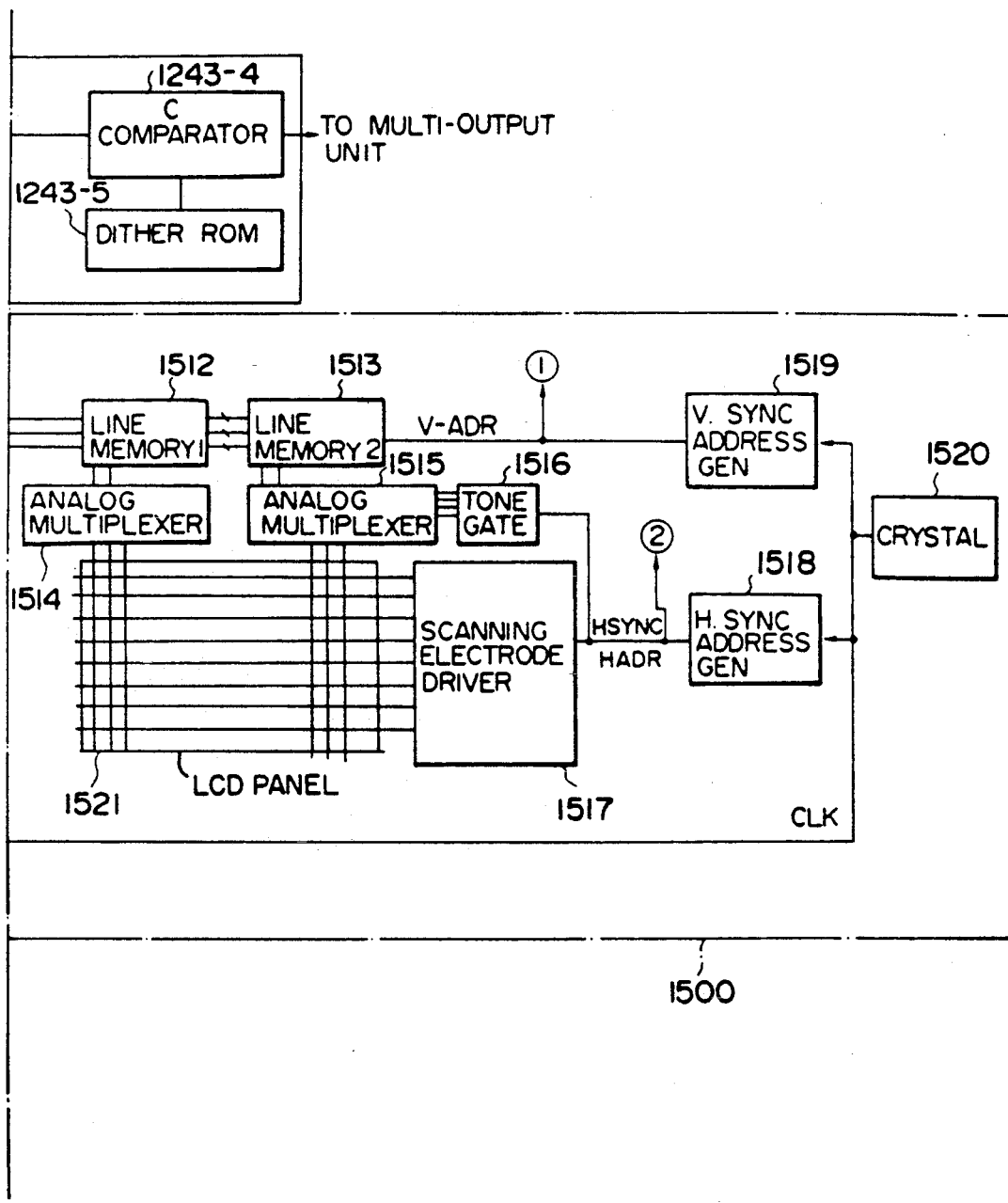

The control unit 19 of the reader, and an image display unit 1500 connected to an image signal system and a sync signal system shown in FIGS. 7A and 7B will be described.

In this embodiment, image signals, i.e., R, G, and B primary color signals, obtained from the reader in a pre-scan mode are simultaneously written in memories 1502 to 1504. In a print mode, of the three primary color signals obtained from the reader, an R signal is sent to the printer in a first scan mode, a G signal is sent to the printer in a second scan mode, and a B signal is sent to the printer in a third scan mode. The image signals simultaneously stored in the memories 1502 to 1504 in the pre-scan mode are sent to the printer in correspondence with the above sending order of the R, G and B signals. Thus, the reader control unit 19 and the image display unit 1500 for the above operations will be described hereinafter.

The image display unit performs write access to internal memories during a pre-scan mode described with reference to the normal sequence. This write access will be described in detail with reference to FIG. 7. First, when the ITOP signals are output upon start of scanning of the reader 121, image signals are output from the CCD sensor 11 shown in FIG. 2A. The image signals propagate through the signal processing board 16, the analog processing unit 1241, and the junction memory 1242 shown in FIG. 7, and R, G, and B signals output from an IPU processing block 1243-1 in the IPU 1243 are transmitted to the image display unit 1500. The R, G, and B signals input to the image display unit 1500 are held by a latch 1506. In this case, the G signal is processed by a sampling circuit 1523, but the B and R signals are output therethrough without modification. The latch timing of the latch 1506 is determined as follows. More specifically, since the color reader of this embodiment scans an A4 original with a resolution of 16 pal, its data volume corresponds to 4752×3360 pixels, while a display means, e.g., an LCD panel or a CRT used in this embodiment is constituted by horizontal 600×400 pixels. The number of pixels of the reader is 8 times that of the CRT, and display densities are considerably different from each other. For this reason, in this embodiment, the data from the reader must be thinned to about ⅛ to be displayed.

An address counter 1501 of this embodiment outputs a signal having a period ⅛ that of the clock RCLK from the reader in the main scan and sub-scan directions. In response to this signal, the latch 1506 latches one of eight pixels of the image signal from the reader, enables a gate 1510 in response to a signal from the control unit 19, and writes the latched data at an address of memories 1502 to 1504 designated by the address counter 1501 In this case, the write enable terminal of the memory is controlled by the control unit 19 to perform write access. In this manner, the color-processed three primary color signals are thinned out to be input. In this case, as will be described later, the G signal is averaged in a predetermined region by the sampling circuit 1523 and is then written in the memory 1503. Then, a copy sequence is started. In this case, the gate 1510 is turned off, a gate 1509 is turned on, and a write enable signal to the memories 1502 to 1504 is OFF (i.e., LOW level), thus setting a read mode. The address counter 1501 updates its generation address so as to read out the data written in the memories 1502 to 1504 under the control of the control unit 19. More specifically, in this case, data corresponding to vertical and horizontal addresses respectively generated from vertical and horizontal sync circuits 1519 and 1518 using a quartz 1520 for a color LCD panel display 1521 as a reference frequency are output from the memories 1502 to 1504. The output signals are converted to data suitable for the color LCD by a γ conversion ROM 1511. The converted R, G, and B signals are recorded in line memories 1512 and 1513. Note that the two line memories are provided but a single line memory may be arranged. The R, G, and B signals are D/A converted to digital video signals by analog multiplex circuits 1514 and 1515 including D/A converters, and are scanned by a scanning electrode driver 1517 to be displayed on the color LCD panel 1521. A tone gate 1516 determines a voltage applied to the scanning electrode in accordance with an average value of 1-line image data, thereby satisfactorily performing halftone display.

As will be described later in detail, the address counter has a programmable arrangement. The latch timing of the latch 1506 is determined by a bus line of the control unit. Since the address counter also has a position designating means, an enlarged image of a specific region can be displayed. The address counter will be described later in detail.

Frames read out from the memories 1502 to 1504 and displayed on the LCD panel 1521 are read out from the memories 1502 to 1504 in accordance with an address output from the address counter 1501 or in response to a timing signal synchronous with the image signals, and are transferred to a latch 1507. Then, only a desired color component signal is picked up from a selector 1508 in accordance with a color selector signal ⓔ from the control unit 19, and a selection state of a selector 1243-3 is controlled by the control unit 19 in accordance with a selector signal ⓐ. In this manner, images can be synthesized.

Figure 8A:
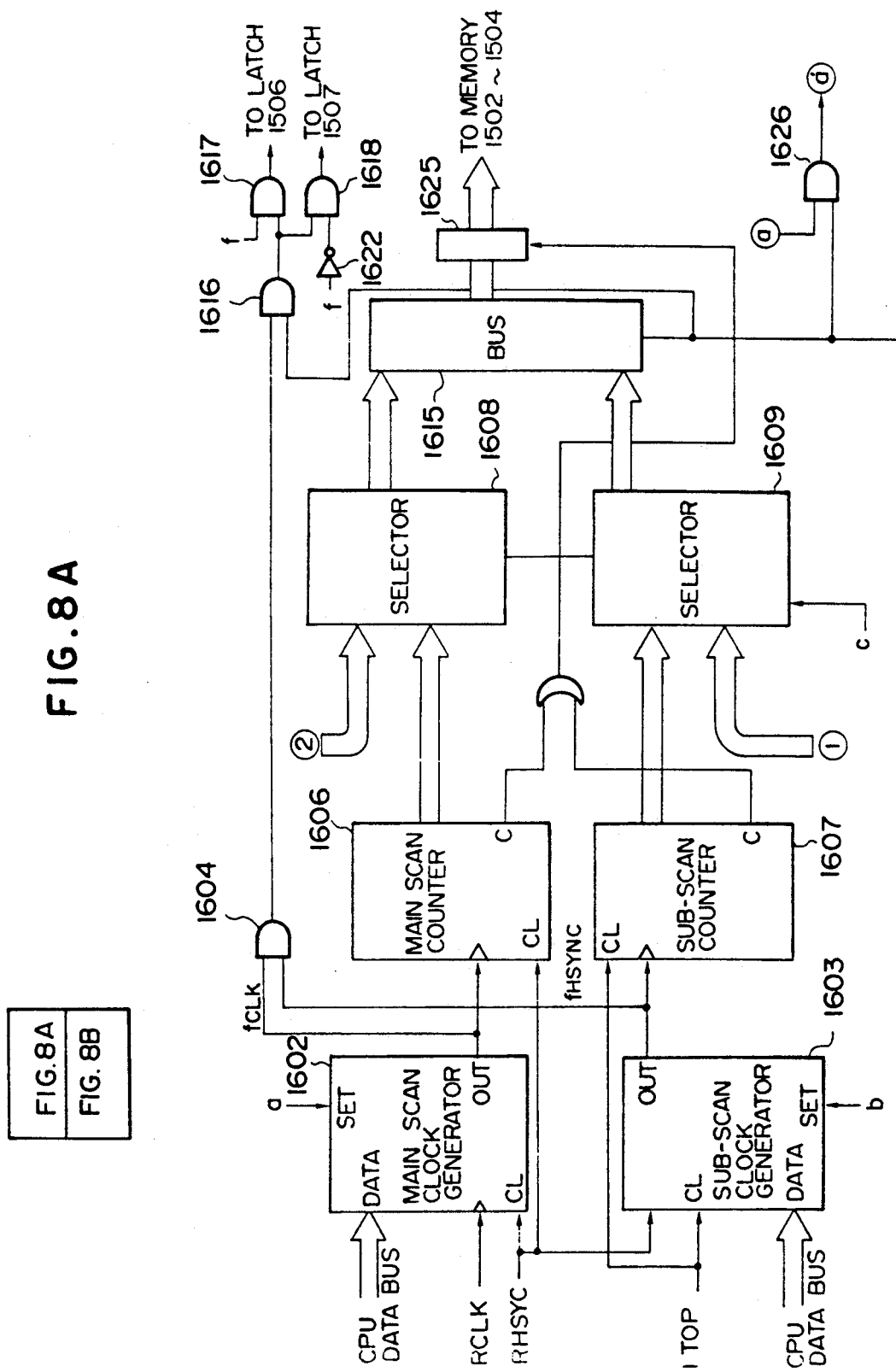
FIGS. 8A and 8B are a block diagram of an address counter.
Figure 8B:
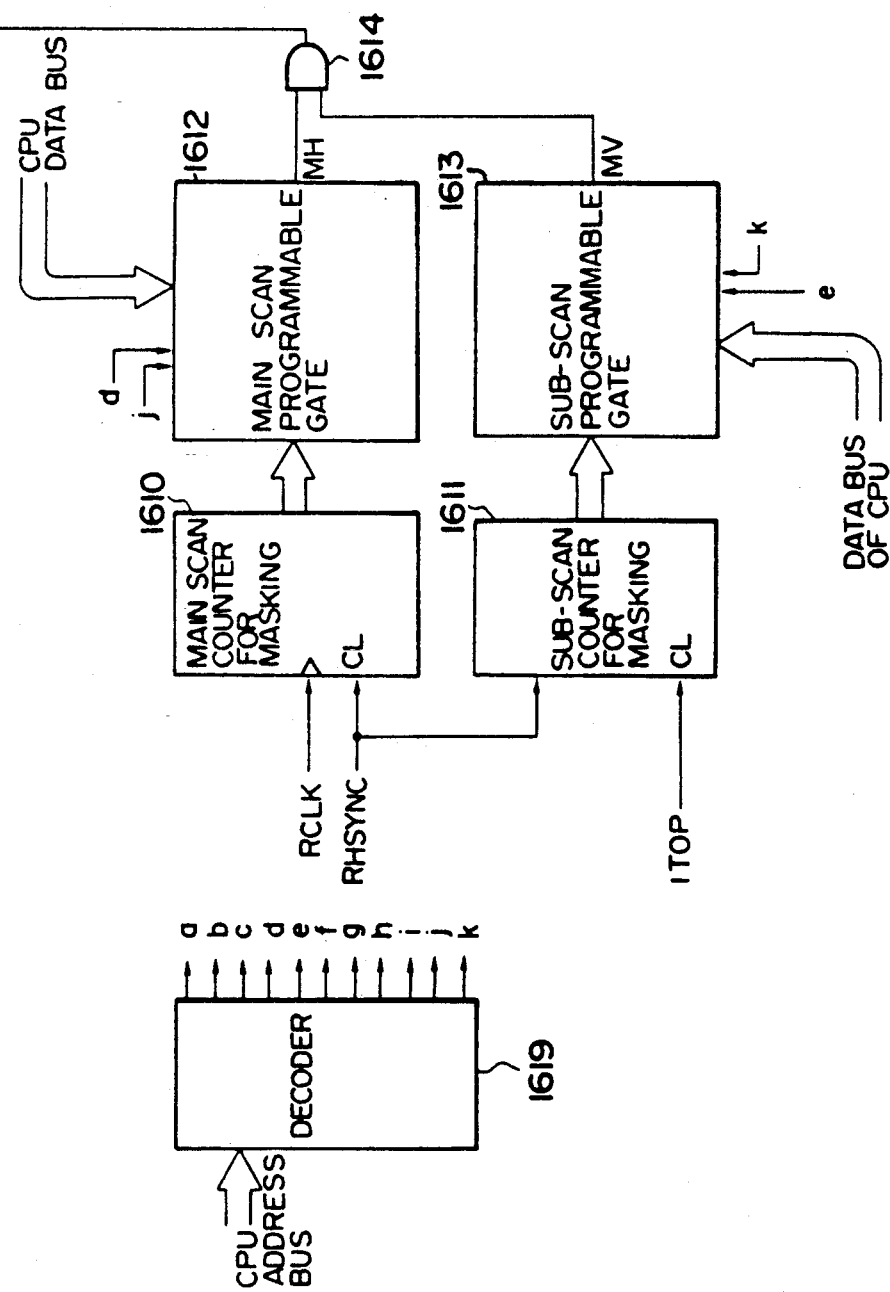

The internal arrangement and operation of the address counter 1501 will be described with reference to FIG. 8. The address counter 1501 receives an instruction address data bus from the CPU 19, and the RCLK, RHSYNC, and ITOP, and LCD display horizontal and vertical address signals. These signals are output to a main scan clock generator 1602 and a sub-scan clock generator 1603. Note that the generator 1602 comprises a counter for frequency dividing the input clocks in accordance with a preset frequency division ratio, and the frequency division ratio is determined by a data output onto a data bus in synchronism with an a signal selected by a decoder 1619 for decoding an address from the CPU 19. Similarly, in the sub-scan clock generator 1603, a frequency division ratio is also determined by data output onto a data bus in synchronism with a b signal selected by the decoder 1619. Note that these setting operations are sequentially performed by the CPU 19 when the power supply is turned on. In the following description of this embodiment, the frequency division ratios in both the main scan and sub-scan directions are respectively set to be ⅛. A clock f-CLK frequency divided by the clock generator 1602 in accordance with this frequency division ratio is counted by a main scan counter 1606. A main scan signal f-HSYNC frequency divided by the frequency division ratio is counted by a sub-scan counter 1607. A logical operation of the f-CLK and f-HSYNC is performed by a gate 1604, and one sample pulse output per an 8×8 matrix is output.

The sample pulse is supplied to the latch 1506 or 1507 through a gate 1616. In accordance with the sample pulse, the latch 1506 latches one sampling data per the 8×8 matrix of the image data output from the reader, and the latched data is written in the memories 1502 to 1504.

The latch 1507 is adopted to hold data read out from the memories 1502 to 1504 during a period wherein 8-pixel data is output from the reader, and to read out this data through a selector 1243-3 shown in FIG. 7 to recover the image data which have been density converted and written in the memories 1502 to 1504. A bus 1615 is a gate for determining whether or not addresses for an image selected by selectors 1608 and 1609 are to be sent to the memories 1502 to 1504, and a bus 1625 is a gate for cutting off an address output from the bus 1615 when the sub-scan counter 1607 overflows. In addition, a gate 1626 is adopted to generate a signal for driving the selector 1243-3. When an image written in the memories 1502 to 1504 is displayed on the LCD panel 1521, the CPU 19 controls the selectors 1608 and 1609 by a signal indicated by c to select addresses indicated by ① and ② in FIG. 7. When the data from the reader are written or when the data are read out from the memories 1502 to 1504 and are printed, the CPU 19 causes the selectors 1608 and 1609 to select addresses output from the counters 1606 and 1607.

An arrangement and an operation for reading out image data written in the image memories 1502 to 1504 as described above will be described. Mask main scan and sub-scan counters 1610 and 1611 must have capacities of 4752 and 3360 pixels as described above in order to scan, e.g., an A4 original. Main scan and sub-scan programmable gates 1612 and 1613 are adopted to respectively generate gate signals MH and MV for synthesizing images stored in the memories 1502 to 1504 in a region surrounded by four coordinate positions corresponding to data written by the CPU in synchronism with signals indicated by j, d, e, and k.

Note that the programmable gates 1612 and 1613 generate signals for controlling the address bus 1615 so as to obtain addresses corresponding to the entire A4 original output from the main scan and sub-scan counters 1606 and 1607 from the address bus 1615 into the memories 1502 to 1504 when the signals j, d, e and k are not obtained from the CPU 19.

The operation of the embodiment with the arrangement shown in FIG. 8 will be described.

A case will be described wherein the image data from the reader are written in the memories 1502 to 1504.

In this case, when the reader including the CCD sensor 11 scans an original on an original table, image data from the CCD sensor 11 are serially output through the junction memory 1242 and the IPU processing circuit 1243-1. Upon scanning on the original by the reader, the RHSYNC (H sync signal of the reader), the ITOP signal (start signal of an image), and the RCLK (clock signal of the reader) are output, and are supplied to the clock generators 1602 and 1603. In this embodiment, the clock generators 1602 and 1603 are arranged to frequency divide the signals input at their clock terminals at a ratio of ⅛ each. Therefore, one latch pulse per an 8×8 matrix consisting of 64 pixels is output to the latch 1506 through the gates 1604 and 1616. Note that a signal f input to the gate 1617 is set at H level when the read data are written in the memories 1502 to 1504. Thus, the latch 1506 latches one data per the 8×8 matrix. On the other hand, the counters 1606 and 1607 respectively count the outputs from the clock generators 1602 and 1603, and the count values therefrom are output to the memories 1502 to 1504 through the selectors 1608 and 1609, the bus 1615, and the gate 1625. Therefore, the image data latched by the latch 1506 are written at addresses corresponding to the count values output from the counters 1606 and 1607.

In this case, the selectors 1608 and 1609 are controlled by a c signal output from the CPU 19 so as to output image data from the counters 1606 and 1607 onto the bus 1615. The latch 1506 directly latches the IPU-processed R and B data of the image data, and latches the G data which is converted to an average value of the 8×8 matrix by the sampling circuit 1523.

Next, a case will be described wherein image data written in the memories 1502 to 1504 are reproduced as a visible image on the LCD panel 1521 shown in FIG. 7.

In this case, the CPU 19 changes the c signal described above so as to control the vertical and horizontal sync address generators 1519 and 1518 shown in FIG. 7 to output addresses onto the bus 1615 through the selectors 1608 and 1609. Thus, data at addresses of the memories 1502 to 1504 designated by the address generators 1519 and 1518 are output to the panel 1521.

A case will be described wherein the image data written in the memories 1502 to 1504 are read out and are supplied to the printers 122-a and 122-b through a multi-output memory 1401.

In this case, the selectors 1608 and 1609 are switched to output the signals from the counters 1606 and 1607 onto the bus 1615. Therefore, the addresses are output from the main scan and sub-scan counters 1606 and 1607 at the same timing when the image data are derived from the reader, and are output to the memories 1502 to 1504 through the bus 1615.

In this case, the memories 1502 to 1504 are set in a read mode by controlling their write enable terminals by the CPU 19.

The above-mentioned f signal is set at L level, and one pulse is output to the latch 1507 in correspondence with the 8×8 matrix. Therefore, signals for 8 pixels on the selector 1243-3 side are successively output as signals to be latched by the latch 1507. In the read mode, the ITOP is counted by the CPU 19, and the CPU 19 controls the selector 1508 in accordance with the count value to select one of the R, G, and B data. For example, when the count value of the ITOP is "1", the selector 1508 selects the R data; when "2", G data; and when "3", B data.

In the above description, it is assumed that no data is set in the programmable gates 1612 and 1613. Therefore, the output from the gate 1614 is always at H level, and the output from the gate 1626 is also at H level. Thus, the selector 1243-3 shown in FIG. 7 outputs the signal from the selector 1508 to a comparator 1243-4. Therefore, only data written in the image memories are printed.

A case will be described wherein data is set in the programmable gates 1612 and 1613 by an image trimming member shown in FIG. 2A.

In this case, the programmable gates 1612 and 1613 output H-level data corresponding to a region set by the trimming member, and the gate 1614 is set at L level with respect to a region other than the set region so that the bus 1615 cuts off the input address. Therefore, only a trimming region is written in the memories 1502 to 1504.

When the image signals are read out from the memories 1502 to 1504 and are supplied to the printers, an output of address data from the bus 1615 is controlled by the data set in the programmable gates 1612 and 1613, and only image data corresponding to a region, area or portion of the image, set by the trimming member are read out from the memories 1502 to 1504 to be output to the comparator 1243-4 through the latch 1507 and the selectors 1508 and 1243-3.

Figure 9:
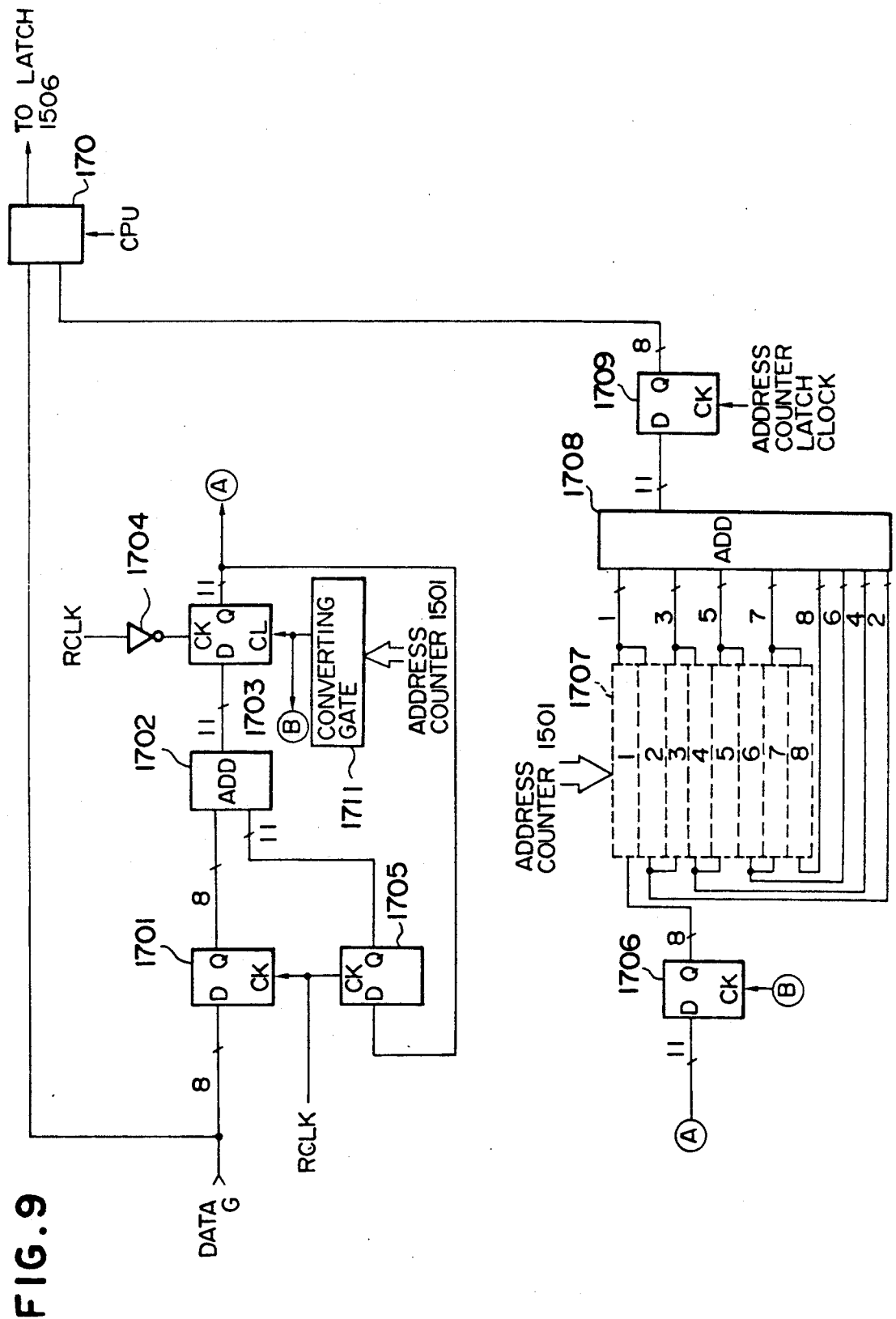
FIG. 9 is a block diagram of a sampling circuit.
Figure 10:
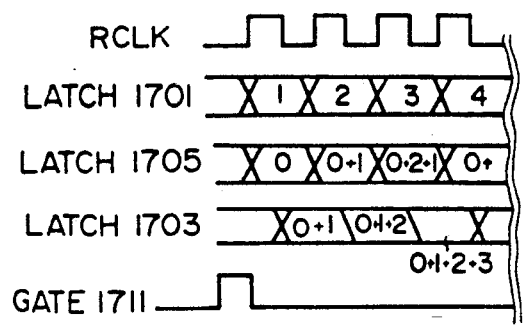
FIG. 10 is a timing chart for the sampling circuit; divided into three subpixels of 15.5 microns×62.5 microns, and Cy, G and Ye color filters are adhered to these three subpixels, respectively.
Figure 11:
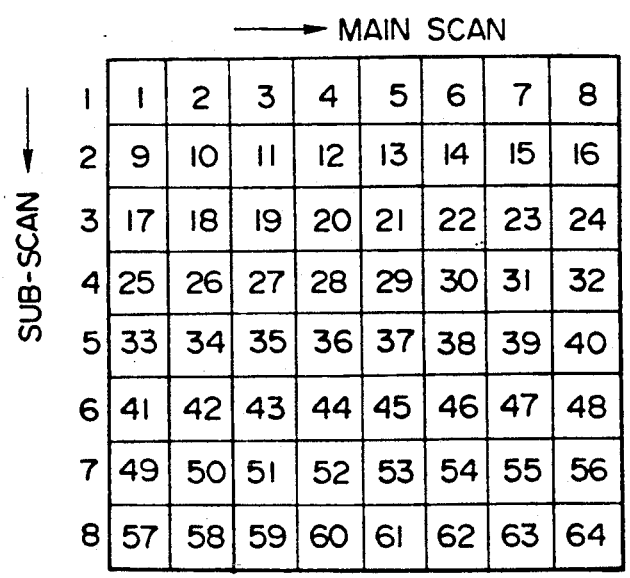

The sampling circuit will be described hereinafter. As shown in FIG. 9, G data is not modified and output since a selector 170 selects through data in accordance with an instruction from the CPU 19. However, with thinned data, an image displayed on a color display screen normally has a low density, and is not easy to see. Therefore, when the CPU 19 switches the selector 1710, data is input to a latch 1701. In a pixel matrix shown in FIG. 11, data "1" to "64" are aligned along the sub-scan and main scan directions. Assume that the first pixel is input to the latch 1701. Prior to this input operation, a converting gate 1711 converts an address from the address counter 1501 into data corresponding to a predetermined clock having an 8-pixel period. At the same time, a latch 1703 is cleared, and data "0" is input to a latch 1705 (see the timing chart shown in FIG. 10). When the first pixel arrives, data "0" is added to the first pixel data by an adder 1702, and the sum is input to the latch 1703. Since the latch 1703 latches data in accordance with the inserted RCLK, data is latched at the center of a pixel and the sum of data "0" and the pixel data is latched. The latched data is latched by the latch 1705 in synchronism with the next clock. The data latched by the latch 1705 is sequentially added to pixels "1", "2", "3", . . . . Note that the adder 1702 and the latches 1703 and 1705 have an 11-bit configuration so as not to overflow even when eight 8-bit data are added. In this manner, data corresponding to the sum of eight pixels is latched at the eighth pixel by a latch 1706 in response to the clock from the converting gate 1711. Note that the latch 1706 outputs only upper 8 bits in response to an 11-bit input. Since the upper 8 bits are output, the resultant data is equivalent to $\frac{1}{8}$ divided data, and average data of eight pixels is output. The average data is sequentially input to 8 line memories 1707. This data corresponds to data which is compressed to $\frac{1}{8}$ in the main scan direction, and is not averaged in the sub-scan direction. Therefore, when data sequentially output from the eight line memories are added by an adder 1708, $$\sum_{1-8} i/8 + \sum_{9-16} i/8 + \ldots + \sum_{57-64} i/8$$

is output if the number of pixel data shown in FIG. 11 is given by i. The output data is latched by a latch 1709 in synchronism with the latch clock f-CLK from the address counter 1501. When the latch 1709 outputs upper 8 bits, this is also equivalent to $\frac{1}{8}$ division, and the output data corresponds to an average of 64 pixels. The output data is sent to the latch 1506 through the selector 170.

In this embodiment, in order to average 64 pixels, 8-pixel averages are calculated in the main scan and the sub-scan direction. However, all the pixels may be processed by the memories.

Figure 12:
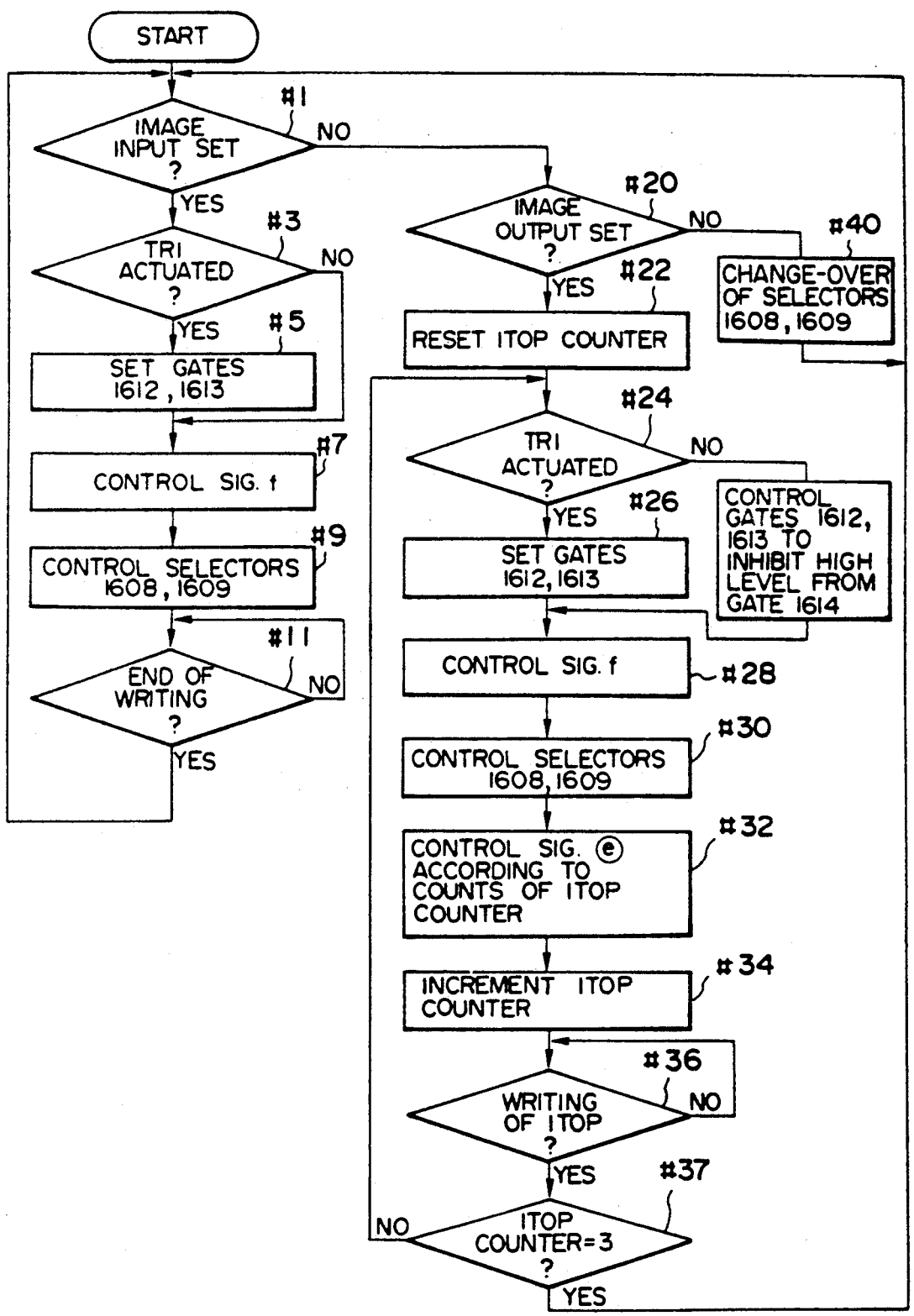

The operation sequence of the CPU 19 for the above-mentioned control operations will be described with reference to FIG. 12. In FIG. 12, the CPU 19 first checks if an image input is set by an image input key IN shown in FIG. 2A (step #1). If the image input is set and if a trimming operation is performed by the trimming member TRI shown in FIG. 2, the programmable gates 1612 and 1613 are set in accordance with the trimming operation (#5) as follows. That is, the CPU 19 sends addresses for designating signals d, e, j, and k for setting the gates 1612 and 1613 to the decoder 1619, so as to send data corresponding to the trimming operation onto the data bus. Then, the CPU 19 causes the reader to start the read operation, sets the write enable signals to the memories 1502 to 1504 at H level, and also sets the signal f at H level, thereby controlling the signal c to switch the selectors 1608 and 1609 to the counters 1606 and 1607. In this manner, the color image data density-converted by the counters 1606 and 1607 and the latch 1506 are stored in the memories 1502 to 1504. Then, the CPU 19 awaits until write access of the image data is completed (#11). Thereafter, the flow returns to step #1.

If no image input is set in step #1, it is checked if an image output is set by an image output key OUT shown in FIG. 2A (#20). If the image output (print operation) is set, the selectors 1608 and 1609 are switched so that the addresses from the horizontal and vertical address counters 1518 and 1519 are output from the bus 1615. In addition, since the write enable signals for the memories 1502 to 1504 are set at L level, the signals written in the memories 1502 to 1504 are read out therefrom, and are displayed on the LCD panel 1521 shown FIG. 7 (#40). In this manner, the image data written in the memories 1502 to 1504 are visually displayed on the LCD panel 1521, and a user can confirm this.

If the image output key OUT is turned on, and the image output (print operation) is set in step #20, the ITOP counter in the CPU 19 is reset (#22). It is then checked if the trimming member is operated (#24). If the trimming member is not operated, the CPU controls the programmable gates 1612 and 1613 so that the gate 1614 does not output H-level data, i.e., addresses are not supplied to the memories 1502 to 1504 through the bus 1615. Therefore, if the trimming member is not operated, data in the memories 1502 to 1504 are not output, and the print operation is not performed.

If the trimming member is operated, the programmable gates 1612 and 1613 are set in the same manner as in step #5 (#26).

Then, the signal f is set at L level to enable the latch 1506 (#28), and the selectors 1608 and 1609 are controlled so that the outputs from the main scan and sub-scan counters 1606 and 1607 are output onto the bus 1615 (#30).

The CPU then causes the reader to start scanning, and controls the signal (e) show in FIG. 7 in accordance with the count value from the ITOP counter in order to control the selectors 1508 and 1243-3. For example, the CPU switches the signal (e) so as to select the R signal upon first scanning of the reader, to select the G signal upon second scanning, and to select the B signal upon third scanning (#32). Furthermore, the CPU increments the ITOP counter (#34), and awaits until the next ITOP is input (#36). Then, the CPU checks if the value of the ITOP counter has reached "3", and repeats the above flow. Upon execution of steps #30 to #37, the image signals from the reader can be synthesized with those stored in the memories 1502 to 1504.

According to this embodiment, the color image signals read from the reader are separated into a plurality of color signals, and the respective color separation signals are subjected to different processing operations. Therefore, the plurality of color separation signals can be satisfactorily processed.

Furthermore, according to this embodiment, when a color original is sequentially read by a read means while separating into a plurality of color signal components, and images corresponding to the respective color components are formed on a photosensitive body, at least two color signal components of a color image to be synthesized with the above color original are simultaneously read by the read means to be stored in image memories. During image synthesis, the color signal components are read out from the image memories in synchronism with color signal components sequentially read by the read means. Therefore, a plurality of images can be synthesized by a smaller number of times of read operations.

What is claimed is:
1. A color image processing system, comprising:
   a color scanner for converting a color original into a color image signal;

a color printer for reproducing a color image corresponding to an input color image signal;

a color memory for memorizing the color image signal;

a combiner for combining a color image signal from said color scanner and a color image signal from said color memory; and controlling means for controlling said color scanner, and said color printer, and said combiner, said controlling means having a first mode for connecting said color scanner directly with said color printer, and a second mode for connecting said color scanner with said color printer through said color memory, wherein in the second mode, a color image signal from said color scanner not through said color memory, and a color image signal from said color memory, are combined by said combiner and outputted.

2. A system according to claim 1, wherein said color image signal comprises three primary color signals.

3. A system according to claim 1, further comprising a monitor for reproducing a visible image corresponding to the color image signal memorized in said memory.

4. A system according to claim 3, wherein said monitor comprises a liquid crystal display monitor.

5. A system according to claim 1, wherein said scanner comprises a flat bed scanner.

6. A system according to claim 1, wherein said color printer comprises a sequential printer.

7. A system according to claim 1, wherein said color printer comprises an electro-photographic printer.

8. An image processing apparatus comprising:

color component generating means for generating a plurality of color component signals;

storage means for storing said plurality of color component signals generated by said generating means;

a first selector for sequentially selecting color component signals in turn;

a second selector for selecting either the color component signals selected by said first selector, or the corresponding color component signal read from said storage means, to produce a color component output signal; and control means for controlling the operation of the second selector so that it (i) selects the color component signal received from the storage means and outputs it as the color component output signal for a portion of an image area and (ii) selects the color component signal received from the first selector and outputs it as the color component output signal for another portion of the image area.

9. Apparatus according to claim 8, wherein said color component signals are read from the storage means and displayed on a display device.

10. Apparatus according to claim 8, wherein the color component generating means converts and optical image into the color component signals.

11. Apparatus according to claim 10, wherein said color component signals are read from the storage means and displayed on a display device.

12. An image processing apparatus according to claim 8, further comprising means for controlling an area of the image for which color component signals are written to said storage means.

13. An image processing apparatus according to claim 12, further comprising second processing means for processing the color component signals before they are selected by the first selector.

14. An image processing apparatus according to claim 12, wherein the color component generating means converts an optical image into the color component signals.

15. Apparatus according to claim 12, wherein said color component signals are read from the storage means and displayed on a display device.

16. An image processing apparatus according to claim 8, further comprising second processing means for processing the color component signals before they are selected by the first selector.

17. An image processing apparatus according to claim 16, wherein the color component generating means converts an optical image into the color component signals.

18. Apparatus according to claim 16, wherein said color component signals are read from the storage means and displayed on a display device.

19. An image processing apparatus according to claim 16, wherein data is thinned before being written to said storage means.

20. An image processing apparatus according to claim 19, wherein data read from said storage means is latched a plurality of times to expand said data.

21. Apparatus according to claim 8, wherein the color component output signal is supplied to a printer for printing.

22. Apparatus according to claim 21, wherein said color component signals are read from the storage means and displayed on a display device.

23. An image processing apparatus according to claim 21, wherein the printer uses an electrophotographic process.

24. Apparatus according to claim 23, wherein said color component signals are read from the storage means and displayed on a display device.

25. An image processing apparatus according to claim 21, wherein the first selector selects a color component signal in response to an operation of the printer.

26. An image processing apparatus according to claim 25, wherein the printer uses an electrophotographic process.

27. Apparatus according to claim 25, wherein said color component signals are read from the storage means and displayed on a display device.

28. An image processing apparatus according to claim 25, wherein said printer is a sequential color printer and said first selector selects a color component signal in response to a sequential printing operation.

29. An image processing apparatus according to claim 8, wherein the color component generating means generates additive color component signals.

30. An image processing apparatus according to claim 29, further comprising second processing means for processing the color component signals before they are selected by the first selector.

31. An image processing apparatus according to claim 29, wherein the color component generating means converts an optical image into the color component signals.

32. Apparatus according to claim 29, wherein said color component signals are read from the storage means and displayed on a display device.

33. An image processing apparatus according to claim 29, wherein said first selector and said second selector select one of said additive color component signals.

34. An image processing apparatus according to claim 33, further comprising second processing means for processing the color component signals before they are selected by the first selector.

35. An image processing apparatus according to claim 33, wherein the color component generating means converts an optical image into the color component signals.

36. Apparatus according to claim 33, wherein said color component signals are read from the storage means and displayed on a display device.

37. An image processing apparatus according to claim 35, wherein the additive color component signals represent red, green and blue components.

38. An image processing apparatus according to claim 37, further comprising second processing means for processing the color component signals before they are selected by the first selector.

39. An image processing apparatus according to claim 37, wherein the color component generating means converts an optical image into the color component signals.

40. Apparatus according to claim 37, wherein said color component signals are read from the storage means and displayed on a display device.

* * * * *

UNITED STATES PATENT AND TRADEMARK OFFICE
CERTIFICATE OF CORRECTION

PATENT NO. : 5,289,270
DATED : February 22, 1994
INVENTOR(S) : KIMIYOSHI HAYASHI Page 1 of 4

It is certified that error appears in the above-indentified patent and that said Letters Patent is hereby corrected as shown below:

COLUMN 2

Line 49, "circuit;" should read --circuit;
    FIG. 11 is a format of 64-pixel data; and
    FIG. 12 is a flow chart for explaining an operation of CPU 19.

DESCRIPTION OF THE PREFERRED EMBODIMENT

According to an embodiment of the present invention, there is provided a color image forming apparatus which can facilitate color correction and reads color data while separating and converting it into electrical signals, and reproduces and records an image in accordance with the color separation signals, wherein the apparatus has a means for displaying a color image in accordance with the reproduction/recording signals.

UNITED STATES PATENT AND TRADEMARK OFFICE
CERTIFICATE OF CORRECTION

PATENT NO. : 5,289,270
DATED : February 22, 1994
INVENTOR(S) : KIMIYOSHI HAYASHI It is certified that error appears in the above-indentified patent and that said Letters Patent is hereby corrected as shown below:

Fig. 1 illustrates a copying machine using a contact type color CCD sensor. A copying machine 120 comprises a color image read apparatus (color reader) 121 and a color image print apparatus (color reader) 122. An original scanning unit (reader) 14 scans in a direction indicated by an arrow A so as to read an image of an original 123. At the same time, an exposure lamp B in the reader 14 is turned on, and light reflected by the original is guided toward a focusing rod lens array 12 and is focused on a contact type color CCD sensor 11. In the CCD sensor 11, five 1024-pixel chips (where one pixel corresponds to 62.5 microns (1/16 mm)) are arranged in a checkerboard pattern. Each pixel is--.

COLUMN 3

Line 30, "12184." should read --1218Y.--.
   Line 57, "sleeves 218Y," should read --sleeves 1218Y,--.
   Line 60, "220C," should read --1220C,--.

COLUMN 4

Line 2, "which" should read --which two--.

COLUMN 5

Line 47, "unit 20" should read --unit--.
   Line 53, "unit 1405" should read --unit 1403--.

UNITED STATES PATENT AND TRADEMARK OFFICE
CERTIFICATE OF CORRECTION

PATENT NO. : 5,289,270
DATED : February 22, 1994
INVENTOR(S) : KIMIYOSHI HAYASHI It is certified that error appears in the above-indentified patent and that said Letters Patent is hereby corrected as shown below:

COLUMN 6

Line 45, "13-5-b" should read --1305-b--.

COLUMN 8

Line 6, "1501-a)" should read --1301-a)--.

COLUMN 10

Line 11, "signal (a)." should read --signal (a')--.

COLUMN 13

Line 4, "inserted" should read --inverted--.

COLUMN 15

Line 58, "and" should read --an--.

UNITED STATES PATENT AND TRADEMARK OFFICE
CERTIFICATE OF CORRECTION

PATENT NO. : 5,289,270
DATED : February 22, 1994
INVENTOR(S) : KIMIYOSHI HAYASHI It is certified that error appears in the above-indentified patent and that said Letters Patent is hereby corrected as shown below:

COLUMN 18

Line 2, "claim 35," should read --claim 33,--

Signed and Sealed this

Twenty-third Day of August, 1994

Attest:

BRUCE LEHMAN

Attesting Officer     Commissioner of Patents and Trademarks